United States Patent [19]

Morita

[11] Patent Number: 5,373,941

[45] Date of Patent: Dec. 20, 1994

[54] MAGNETIC TAPE CASSETTE STORAGE CASE WITH GROOVE PORTIONS

[75] Inventor: Kiyoo Morita, Kanagawa, Japan

[73] Assignee: Fuji Photo Film Co., Ltd., Kanagawa, Japan

[21] Appl. No.: 132,327

[22] Filed: Oct. 6, 1993

[30] Foreign Application Priority Data

Oct. 16, 1992 [JP] Japan .................. 4-078158[U]

[51] Int. Cl.$^5$ .......................................... B65D 85/575
[52] U.S. Cl. .......................................... 206/387; 206/493
[58] Field of Search .................. 206/387, 493, 444

[56] References Cited

U.S. PATENT DOCUMENTS

| | | |
|---|---|---|
| 3,811,745 | 5/1974 | Cylke . |
| 5,160,028 | 11/1992 | Morita ...................... 206/387 |
| 5,165,541 | 11/1992 | Morita ...................... 206/387 |
| 5,186,325 | 2/1993 | Sato et al. ................ 206/387 X |

FOREIGN PATENT DOCUMENTS

| | | |
|---|---|---|
| 1169389 | 6/1984 | Canada ...................... 206/387 |
| 0440424 | 8/1991 | European Pat. Off. . |
| 0494690 | 7/1992 | European Pat. Off. . |
| 0537678 | 4/1993 | European Pat. Off. . |
| 2387493 | 12/1978 | France ...................... 206/387 |
| 2488029 | 5/1982 | France . |
| 1440180 | 6/1976 | United Kingdom ......... 206/387 |
| 2162826 | 2/1986 | United Kingdom . |
| 2262512 | 6/1993 | United Kingdom . |

*Primary Examiner*—Bryon P. Gehman
*Attorney, Agent, or Firm*—Sughrue, Mion, Zinn, Macpeak & Seas

[57] ABSTRACT

A magnetic tape cassette storage case having reduced exterior dimensions of the cassette storage case and the magnetic tape cassette is prevented from rattling in the case. To assure that a magnetic tape cassette is properly inserted into a pocket portion of the case with one side end of the cassette inserted first, a groove portion is formed on the side wall of the cassette so as to allow one projection-shaped guide portion to be received therein, and a recess portion is formed on the inner wall surface of a side wall of a casing member so as to allow the other projection-shaped guide portion to be received therein.

13 Claims, 9 Drawing Sheets

MAGNETIC TAPE CASSETTE STORAGE CASE WITH GROOVE PORTIONS

BACKGROUND OF THE INVENTION

The present invention relates generally to a magnetic tape cassette storage case. More particularly, the present invention relates to an improved magnetic tape cassette storage case especially adapted to receive and store therein an audio magnetic tape cassette.

A conventional Philips-type audio magnetic tape cassette includes a front opening portion adapted to receive a magnetic head therein when the cassette is inserted into a recording/reproducing unit for recording or reproduction. The magnetic tape in the cassette is made to run across the front opening portion.

With such construction, dust or similar foreign matter can enter the cassette through the front opening portion. Once the magnetic tape is contaminated by dust or the like adhering to the tape, signal dropout can occur, adversely affecting the recording or reproducing characteristics of the tape. Moreover, since the housing of the cassette is molded of a synthetic resin, it can readily be broken if dropped or if it receives an external impact such as when struck against an obstacle or the like.

To prevent the magnetic tape from being contaminated with dust or similar foreign matter, and moreover to protect the cassette from being breakage or the like, the cassette is normally stored in a magnetic tape cassette storage case when the cassette is not in use.

The basic structure of a conventional cassette storage case will briefly be described below. The cassette storage case includes as essential components a cover member having a pocket portion formed at the front end part thereof to receive the opposite raised portions of the cassette in the pocket portion, and a casing member rotatably fitted to the cover member so that it can be opened and closed in a door-like manner. The cover member and the casing member are each integrally molded of a synthetic resin.

When the cassette is received in the cassette storage case, the thick portion of the cassette at the front opening portion is first inserted into the pocket portion, and subsequently the casing member is rotatably closed against the cover member. Once the casing member is closed with the cover member, the whole cassette is received in the cassette storage case so as to enable the cassette to be safely snored in the cassette storage case without the possibility of the magnetic tape being contaminated with dust or similar foreign matter, and to prevent the cassette from being broken if dropped or if an external impact is imposed thereon.

Figure 13:
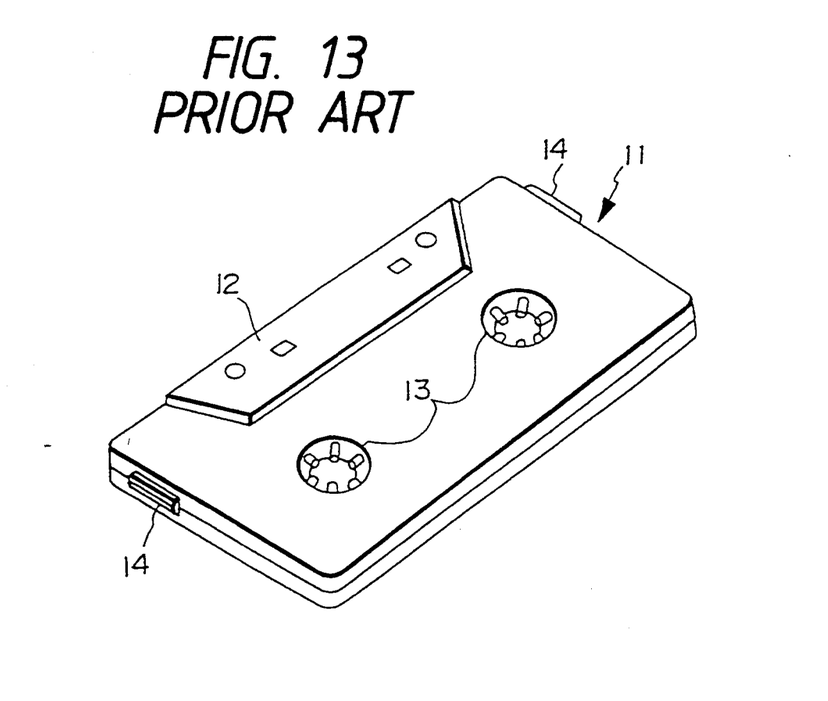
FIG. 13 is a perspective of a conventional magnetic tape cassette.

FIG. 13 depicts a conventional cassette 11, which is is wide use at the present time. As is apparent from the drawing, the cassette 11 has generally a rectangular configuration, and includes raised portions 12 extending outward from the respective opposite surfaces of the main body of the cassette 11 to thus cause the cassette 11 to have a portion of increased thickness. The cassette also has a pair of shaft insertion holes 13, each serving to allow a magnetic tape wound about tape hubs to transversely run across an opening portion formed on the front side wall of the main body to receive a magnetic recording/reproducing head therein. In addition, projection-shaped guide portions 14 serving as guides to allow the cassette 11 to be correctly inserted into a tape recorder or the like are formed on the opposite side walls of the main body of the cassette 11.

The raised portions 12 and the guide portions 14 are dimensionally standardized for the purpose of maintaining interchangeability of cassettes. For this reason, the raised portions 12 and the guide portions 14 cannot must always be provided on the main body of the cassette 11. Therefore, the dimensions of the pocket portion formed in the cassette storage case must be determined such that the raised portions 12 and the guide portions 14 can be received in the pocket portion. As a result, the exterior dimensions of the cassette storage case are set to values corresponding to the exterior dimensions of the cassette at the portions of increased thickness, resulting in a cassette storage case unavoidably having significantly larger dimensions than the cassette it houses.

As is well known, a magnetic tape cassette is sometimes used in an automobile or at an outdoors location after being carried to such location by the user. Because of the relatively large size of the conventional cassette storage case, a corresponding large amount of storage space is required in the automobile or the like, and moreover it is often inconvenient for the user to carry such a cassette storage case. Under the circumstances described above, a demand has arisen for providing a magnetic tape cassette storage case of reduced dimensions, specifically, a reduced thickness.

SUMMARY OF THE INVENTION

The present invention has been made in consideration of the aforementioned background, and an object thereof resides in the provision of a magnetic tape cassette storage case which is constructed such that the exterior dimensions of the cassette storage case can be substantially reduced compared with the conventional cassette storage case, and moreover the cassette is prevented from undesirably rattling in the cassette storage case after the former is received in the latter.

According to one aspect of the present invention, there is provided a magnetic tape cassette case including a cover member having a pocket portion formed at one end part thereof to receive one end part of the opposite end parts of a magnetic tape cassette and a casing member having rotation preventing projections formed thereon, the cover member being rotatably fitted to the casing member, wherein the magnetic tape cassette storage case is characterized in that a groove portion for receiving a projection-shaped guide portion on the one end part of the magnetic tape cassette therein when the one end part of the magnetic tape cassette is received in the pocket portion of the cover member is formed on at least one side wall of the opposite side walls constituting the pocket portion of the cover member.

According to another aspect of the present invention, there is provided a magnetic tape cassette storage case including a cover member having a pocket portion formed at one end part thereof to receive one end part of the opposite end parts of a magnetic tape cassette and a casing member having rotation preventing projections formed thereon, the cover member being rotatably fitted to the casing member, wherein the magnetic tape cassette storage case is characterized in that a groove portion for receiving a projection-shaped guide portion on the one end part of the magnetic tape cassette therein when the one end part of the magnetic tape cassette is received in the pocket portion of the cover member is formed on one side wall of the opposite side walls constituting the pocket portion of the cover member, and that a recess portion for receiving a projection-shaped guide portion on the other end part of the magnetic tape cassette therein when the one end part of the magnetic tape cassette is received in the pocket portion of the cover member is formed on a wall portion corresponding to the other end part of the magnetic tape cassette therein.

According to yet another aspect of the present invention, there is provided a magnetic tape cassette storage case including a cover member having a pocket portion formed at one end part thereof to receive the opposite raised portions of the magnetic tape cassette therein and a casing member having rotation preventing portions formed thereon, characterized in that a groove portion for receiving a projection-shaped guide portion on one part of the opposite end portions of the magnetic tape cassette therein is formed on at least one inner wall surface of one of the opposite side walls constituting the pocket portion of the cover member.

Since at least one projection-shaped guide portion at the opposite ends of the magnetic tape cassette is received in the groove portion formed in the pocket portion of the cover member, a large part of the projection-shaped guide portion is received in the side wall of the pocket portion of the cover member or the side wall of the casing member, whereby exterior dimensions of the cassette storage case can be reduced by an amount corresponding to at least the height of the projection-shaped guide portion.

For example, in the case where the cassette storage case is constructed to receive one of the opposite end parts of the magnetic tape cassette in the pocket portion of the cover member, it is desirable that a groove portion for receiving the projection-shaped guide portion therein be formed on the bottom wall of the pocket portion of the cover member, whereby the exterior dimensions of the cassette storage case can be reduced by an amount corresponding to the height of the projection-shaped guide portion. In addition, when the groove portion is formed on the bottom wall of the pocket portion of the cover member, and moreover a recess for receiving a projection-shaped guide portion at the other end part of the magnetic tape cassette therein is formed on a side wall of the casing member, the exterior dimensions of the cassette storage case can be reduced by an amount corresponding to a height of both of the two projection-shaped guide portions.

Where the cassette storage case is constructed so as to allow the opposite raised portions of the magnetic tape cassette to be received in the pocket portion of the cover member, it is desirable that groove portions for receiving the projection-shaped guide portions therein be formed on at least one of the opposite side walls of the pocket portion of the cover member, more preferably on the opposite side walls of the same, whereby the exterior dimensions of the cassette storage case can be reduced by an amount corresponding to a height of both of the projection-shaped guide portions.

DESCRIPTION OF THE PREFERRED EMBODIMENTS

The present invention will now be described in detail hereinafter with reference to the accompanying drawings, which illustrate several preferred embodiments thereof.

Figure 1:
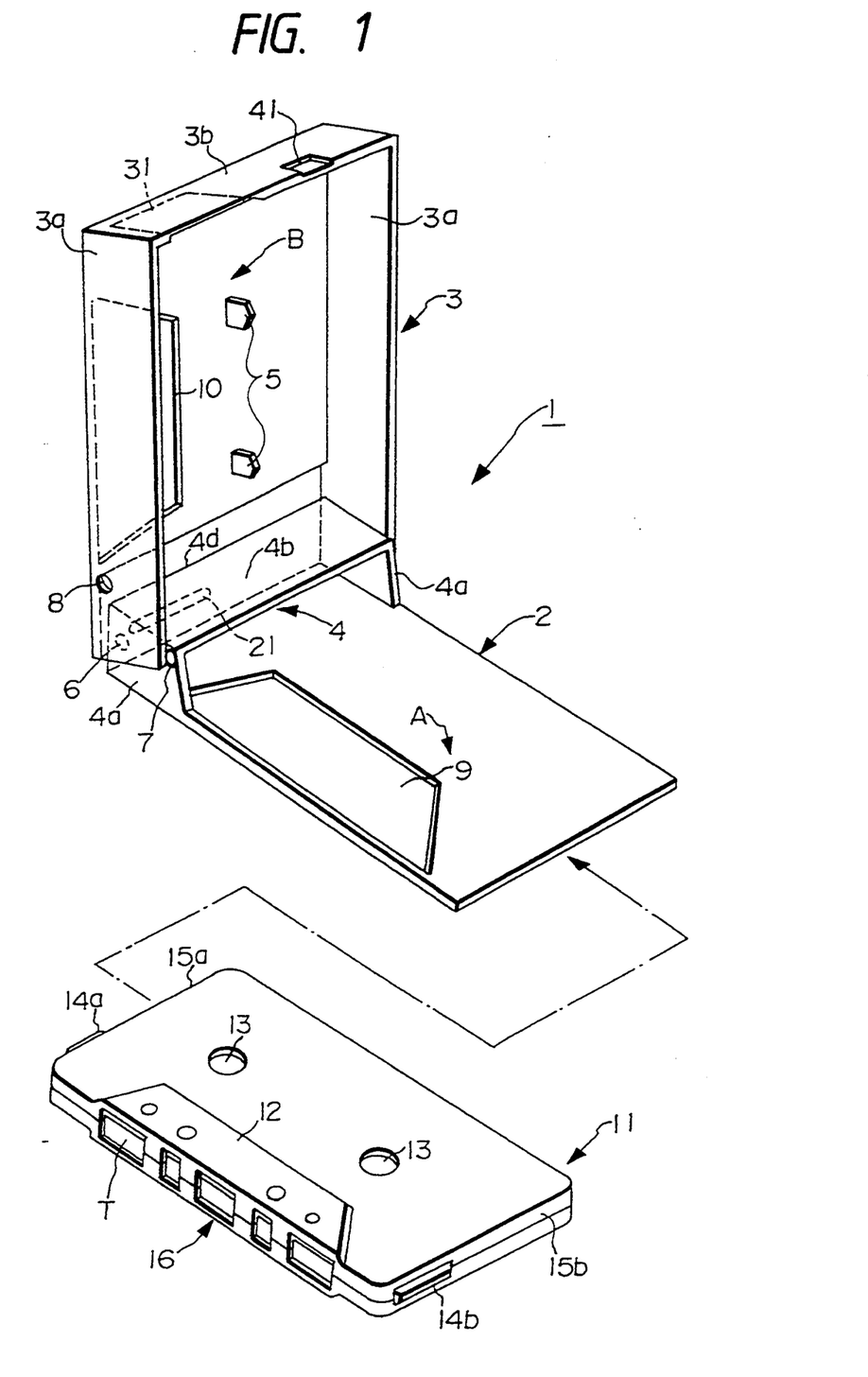
FIG. 1 is a perspective view of a magnetic tape cassette storage case constructed according to a first embodiment of the present invention, particularly showing a case member in an open state before a magnetic cassette is received in the cassette storage case.
Figure 2:
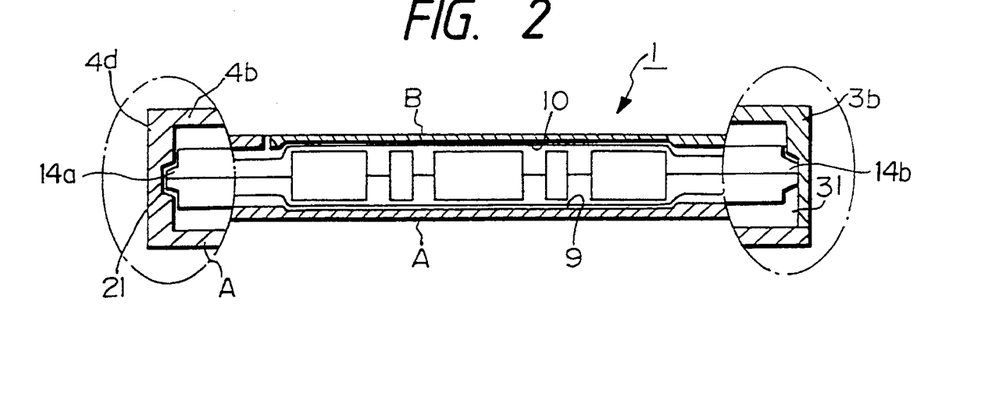
FIG. 2 is an enlarged sectional view of the cassette storage case shown in FIG. 1, particularly showing the opposite sides of the cassette on an enlarged scale.

A magnet tape cassette storage case constructed according to a first embodiment of the present invention will be described below with reference to FIGS. 1 and 2. FIG. 1 is a perspective view of the magnetic tape cassette storage case, and FIG. 2 is an enlarged sectional view of the magnetic tape cassette storage case, particularly showing the structure of essential components constituting the cassette storage case on an enlarged scale. Since the inventive magnetic tape cassette is substantially similar to the conventional case in FIG. 13 in many structure features, structural components constituting the two magnet tape cassettes are represented by like reference numerals, and a further detailed description of common components will be omitted.

The magnetic tape cassette storage case 1 includes as an essential component a cover member 2 having a pocket portion 4 formed at the front end part thereof and a casing member 3 having a pair of rotation preventing projections 5 projecting therefrom. A support shaft 6 extends inside each of the opposite side walls 3a of the casing member 3 and is fitted into a hole (not shown) formed through each of the opposite side walls 4a of the pocket portion 4. With this construction, the cover member 2 can rotatably be opened and closed relative to the case member 3 in a door-like manner with the aid of the support shafts 6 fitted into respective holes.

Basically, the cover member 2 has a parallelpiped-shaped configuration having a small thickness, wherein the area of the cover member 2 as measured along a planar portion A thereof is slightly larger than the area of a magnetic tape cassette 11 as measured along the planar thereof. The pocket portion 4 of the cover member 2 is dimensioned to receive one of the opposite ends 15a and 15b of the magnetic tape cassette 11, i.e., a left-hand end 15a of the same in this illustration. Specifically, the pocket portion 4 is designed in a box-shaped configuration of which one end is open, and includes a flat plate portion A, opposite side wall portions 4a, an upper plate portion 4b and a bottom side wall portion 4d. In addition, an opening portion 9 is formed on the flat plate portion A so as to receive the raised portion 12 of the magnetic tape cassette 11 of increased thickness. In the case shown, another raised portion 12 is likewise formed on the lower surface side of the magnetic tape cassette 11.

Thus, in this embodiment, with the magnetic tape cassette storage case 1 constructed in the above-described manner, the magnetic tape cassette 11 can be inserted into the cassette storage case 1 in the longitudinal direction.

The casing member 3 is designed in such a configuration that a flat plate portion B is surrounded by the opposite side walls 3a and the front wall 3b along the three sides thereof, and a pair of rotation preventing projections 5 are formed on the planar portion B while integrally projecting from the latter. When the cassette 11 is first received in the cover member 2 and the casing member 3 is then rotatably closed with the cover member 2, the rotation preventing projections 5 are inserted through shaft insertion holes 13 to come into engagement with tape hubs (not shown) in the cassette 11 in order to prevent the magnetic tape T from being loosened.

To receive a raised portion 12 on the upper surface of the magnetic cassette 11 when the casing member 3 is rotatably closed with the cover member 2, a recess portion 10 is formed on the flat plate portion B in the region positionally corresponding to the raised portion 12.

A projection 7 is formed on the left-hand side wall 4a of the pocket portion 4 while projecting inward of the side wall 4a, and an engagement recess 8 is formed on the left-hand side wall 3a of the casing member 3 at a position corresponding to the projection 7 so as to allow the projection 7 to be fitted into the engagement recess 8 when the casing member 3 is rotatably closed with the cover member 2. With this construction, when the casing member 3 is closed with the cover 2 by turning the cover member 2 about the support shafts 8, the projections 7 are fitted into the engagement recess portions 8 so that the cover member 2 is held in the closed state relative to the casing member 3.

The cassette storage case 1 constructed in the above-described manner has two remarkable structural features as noted below.

One of the structural features is that a groove portion 21 is formed on the inner wall surface of a rear wall portion 4d of the pocket portion 4 in the region positionally corresponding to a left-hand projection-shaped guide portion 14a of the cassette 11 so as to allow the projection-shaped guide portion 14a to be fitted into the groove portion 21 when the cassette 11 is received in the pocket portion of the cover member 2.

The other structural feature is that a recess portion 31 is formed on the inner wall surface of a front side wall 3b of the casing member 3 in the region positionally corresponding to a right-hand projection-shaped guide 14b of the cassette 11 so as to allow the projection-shaped guide 14b to be fitted into the recess portion 31 when the cassette 11 is received in the pocket portion 4 of the cover member 2.

In this embodiment, when the cassette 11 is received in the cassette storage case 1, the cassette 11 is inserted into the pocket portion 4 with the left-hand end 15a of the cassette 11 inserted first, and subsequently, after the upper raised portion 12 of the cassette 11 is received in the recess portion 9, the casing member 3 is turned about the support shafts 6 in the closing direction.

The groove portion 21 has a length and a depth sufficient to allow the projection-shaped guide portion 14a to be fitted into the groove portion 21 as shown on an enlarged scale at the left-hand side of FIG. 2. However, since there is a need of allowing the projection-shaped guide portion 14b to be slidably received in the recess portion 31 as the casing member 3 is turned about the support shafts 6, the recess portion 31 is formed on the inner wall surface of the front side wall 3b extending parallel to the front side wall 3b to reach the open end of the latter, as shown on an enlarged scale at the right-hand part of FIG. 2.

Since the groove portion 21 and the recess portion 31 are formed on the cassette storage case 1, the left-hand projection-shaped guide portion 14a is received in the groove portion 21, while the right-hand projection-shaped guide portion 14b is slidably received in the recess portion 31, as shown in FIG. 2 on an enlarged scale. Thus, when the cassette 11 is inserted into the pocket portion 4, the projection-shaped guide portions 14a and 14b are received in the rear wall 4d and the front wall 3b as if they were embedded therein. Consequently, the width of the cassette storage case 1 can be reduced by an amount corresponding to the sum of the height of the left-hand projection-shaped guide portion 14a and the height of the right-hand projection-shaped guide portion 14b.

It should be noted that recess portions 9 and 10 are formed on the cassette storage case 1 in order to receive the opposite raised portions 12 of the cassette 11 therein. Similarly, the thickness of the cassette storage case 1 can be reduced by an amount corresponding to the sum of the height of the upper raised portion 12 and the height of the lower raised portion 12. Thus, the overall structure of the cassette storage case 1 has smaller dimensions owing to the reduction of the thickness of the cassette storage case 1 in addition to the reduction of the width of the same.

Figure 3:
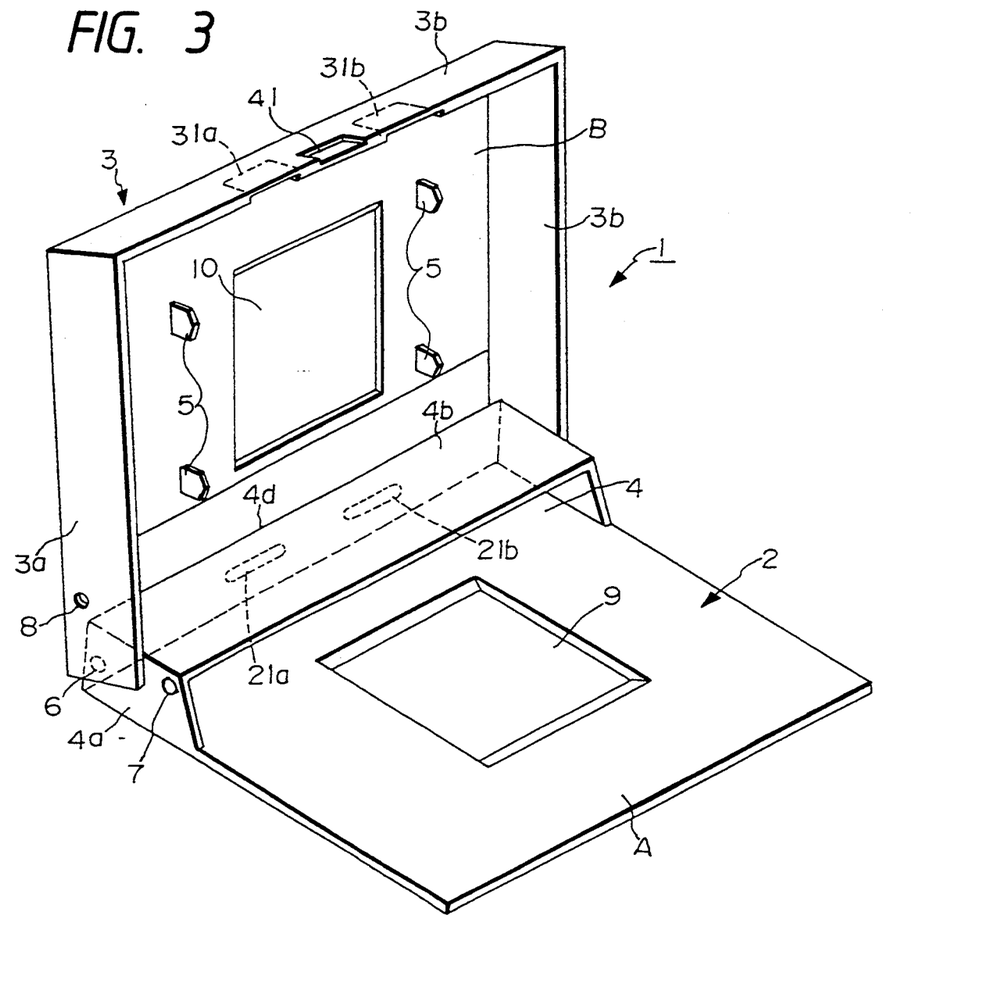
FIG. 3 is a perspective view of a magnetic tape cassette storage case constructed according to a second embodiment of the present invention.
Figure 4:
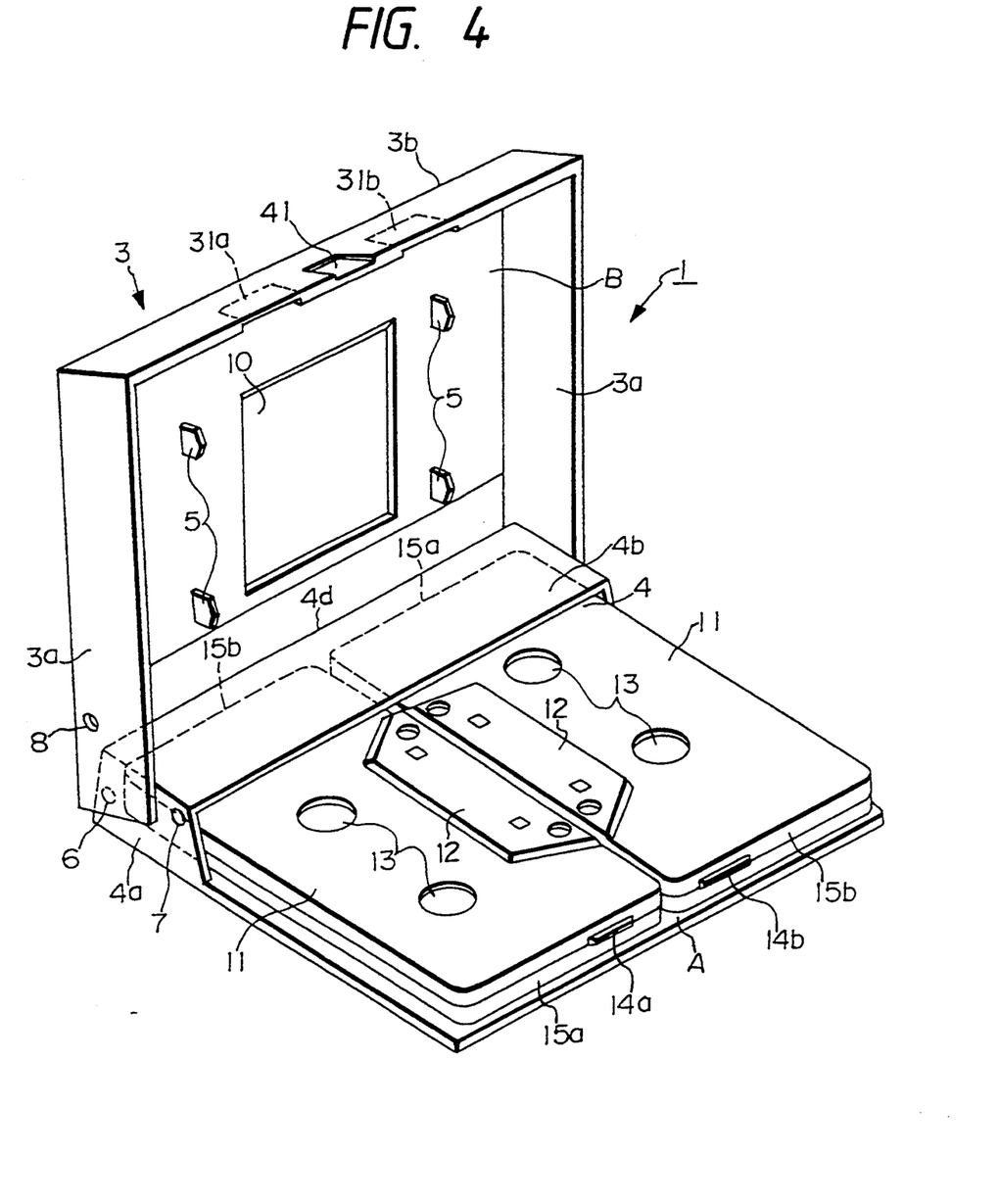
FIG. 4 is a perspective view of the cassette storage case shown in FIG. 3, particularly showing two cassette are inserted into a common pocket portion.

Next, a magnetic in tape cassette storage case constructed according to a second embodiment of the present invention will be described below with reference to FIG. 3 and FIG. 4. FIG. 3 is a perspective view of the cassette storage case 1, and FIG. 4 is a perspective of the magnetic tape cassette storage case 1, particularly showing two cassettes 11 received in the cassette storage case 1. A characterizing feature of the cassette storage case 1 constructed according to the second embodiment of the present invention resides in the fact that two groove portions 21a and 21b and two recesses 9 and 10 are formed on the cassette storage case 1 so as to allow the opposite raised portions 12 and the projection-shaped guide portions 14a and 14b of the cassettes 11 to be received in the groove portions 21a and 21b and in the recesses 9 and 10. Components similar to those shown in FIGS. 1 and 2 are represented by like reference numerals, and a further detailed description on these components will be omitted.

In this embodiment, as shown in FIG. 4, the cassette storage case 1 is constructed such that two cassettes 11 are received therein while their opening portions (not shown) face each other, and a recess 9 having a wide area sufficient to receive two lower raised portions 12 therein is formed on a flat plate portion A in the central region of the latter.

Similarly, a pocket portion 4 has a large enough volume to simultaneously receive the two cassettes 11 therein, with the right-hand ends 15a and 15b of the cassettes 11 inserted first. In addition, two groove portions 21a and 21b are formed on the inner wall surface of a rear wall 4d of the cassette 1 at positions which positionally coincide with two projection-shaped guide portions 14a and 14b when the two cassettes 11 are received in the pocket portion 4 by rotatably closing the case member 3 with the cover member 2.

On the other hand, a recess 10 having a wide area sufficient to receive two upper raised portions 12 of the cassettes 11 therein is formed in the central region of a planar portion B of a casing member 3. In addition, two recess portions 31a and 31b are formed on the inner wall surface of a front side wall 3b at the positions which positionally coincide with right-hand projection-shaped guide portions 14a and 14b when the two cassettes 11 are received in the pocket portion 4 by rotatably closing the casing member 3 with the cover member 2.

With the cassette storage case 1 constructed in the above-described manner, as shown in FIG. 4, when two cassettes 11 are received in the cassette storage case 1, a left-hand end 15a of one cassette 11 is received in the pocket portion 4, and a left-hand projection-shaped guide portion 14a of the same is fitted into the groove portion 21b. On the other hand, a lefthand end 15b of the other cassette 11 is received in the pocket portion 4, and a left-hand projection-shaped guide portion 14b of the same is fitted into the groove portion 21a.

When the casing member 3 is rotatably closed with a cover member 2 by turning the casing member 3 about support shafts 6, a right-hand projection-shaped guide portion 15b is fitted into the recess portion 31b and a right-hand projection-shaped guide portion 14a is fitted into the recess portion 21a.

Also with the cassette storage case 1 constructed according to the second embodiment of the present invention, the width of the cassette storage case 1 can be reduced by an amount corresponding to the sum of the height of the projection-shaped guide portion 14a and the height of the projection-shaped guide portion 14b because both the projection-shaped guide portions 14a and 14b of the two cassette 11 are received in the groove portions 21a and 21b and recess portions 31a and 31b. In addition, the thickness of the cassette storage case 1 can likewise be reduced by an amount corresponding to the height of the opposite raised portions 12 of the cassette 11 because the opposite raised portions 12 of the cassette 11 are received in the recess portions 9 and 10. Consequently, the cassette storage case 1 can be designed with smaller dimensions.

Next, a magnet tape cassette storage case constructed according to a third embodiment of the present invention will be described below with reference to FIG. 5.

A main difference of the cassette storage case constructed according to the third embodiment of the present invention from that of the second embodiment resides in the fact that an opening portion of each of two cassettes 11 is oriented in the outward direction, and moreover a structure is provided in the cassette storage case 1 for preventing each cassette 1 from being inserted into a pocket portion 4 in an inverted state. Also in this embodiment similar structural components as those in the second embodiment are represented by the same reference numerals. Thus, a further detailed description of such components will be omitted.

Figure 5:
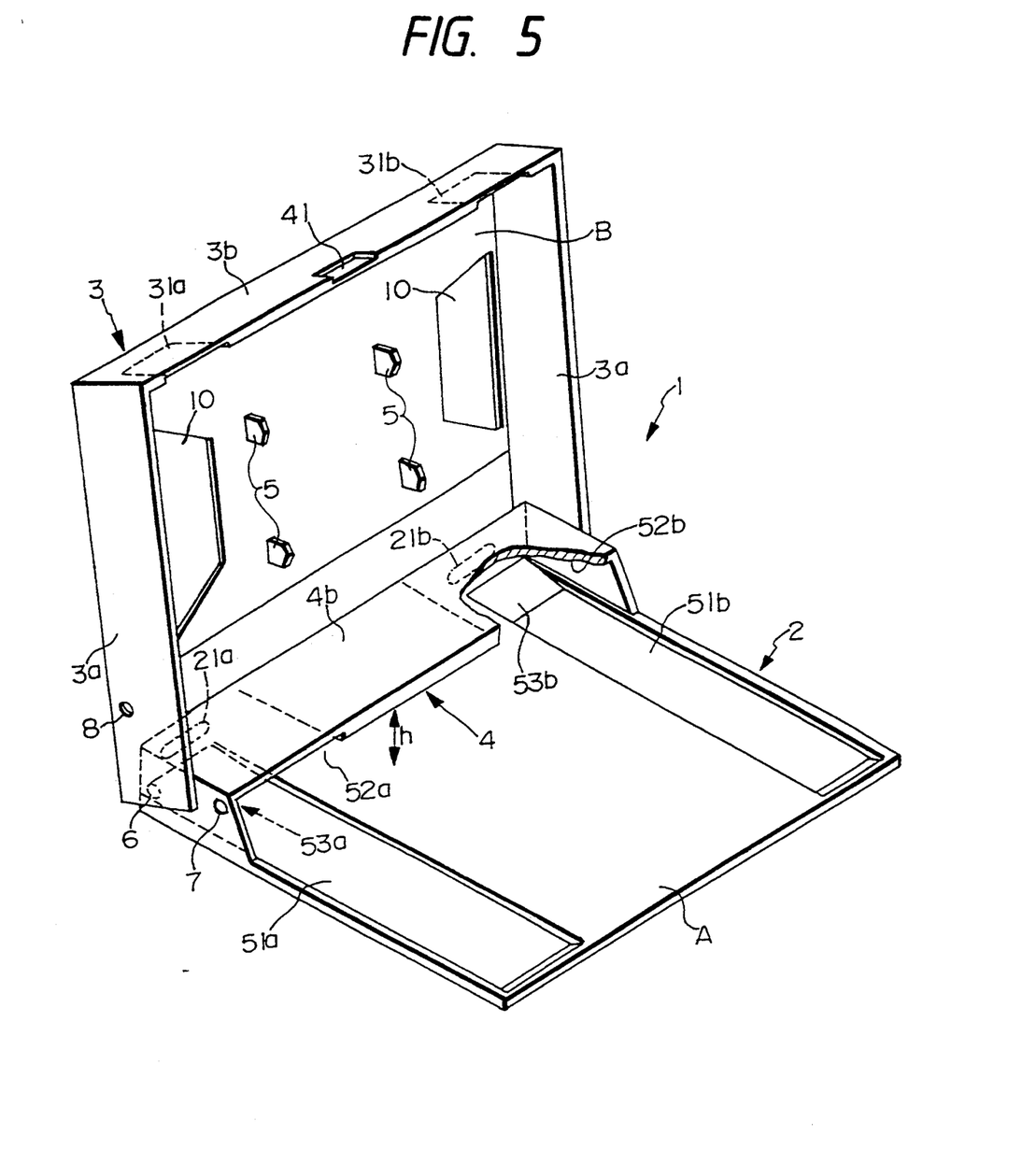
FIG. 5 is a perspective view of a magnetic tape storage case constructed according to a third embodiment of the present invention.

FIG. 5 is a perspective view of the cassette storage case 1 of the third embodiment. A pair of longitudinally extending recess portions 51a and 51b each oriented toward the pocket portion 4 are formed on a planar portion A of a cover member 2 while extending parallel to the opposite sides of the cassette storage case 1. In addition, recess portion 52a and 52b are formed on the lower surface of an upper plate 4b of the pocket portion 4 at positions located opposite the recess portions 51a and 51b.

The left-hand ends of the recess portions 51a and 51b slantwise extend in the form of inclined surfaces 53a and 53b. The height h as measured between the flat plate portion A and the lower surface of the upper plate 4b of the pocket portion 4 is sufficient to permit a planar portion of each cassette 11, namely, the main part of the cassette 11 having the shaft insertion holes 13 formed therein, to pass therebetween, while the height between the recess portions 51a and 51b and each of the recess portions 52a and 52b is made sufficient to permit the opposite raised portions 12 of the cassette 11 to pass therebetween.

On the other hand, a pair of recess portions 10 are formed on a flat plate portion B of a casing member 3 at positions which positionally coincide with the raised portions 12 of each cassette 1 when the casing member 3 is rotatably closed with the cover member 2. It should be noted that it suffices for each raised portion 12 to be received in the corresponding recess portion 10, and it is not always necessary that each recess portion 10 extend in the longitudinal direction.

Recess portions 31a and 31b are formed on the inner wall surface of a front side wall 3b of the casing member 3 at positions corresponding to projection-shaped guide portions 14a and 14b of each cassette 11.

With the cassette storage case 1 constructed in the above-described manner, raised portions 12 of the two cassettes 11 are first received in the recess portions 51a and 51b on the cover member 2, and thereafter they are thrust in the forward direction. As they are inserted in this manner, the raised portions 12 of the two cassettes 11 are slidably received between the recess portions 51a and 52a as well as between both the recess portions 51b and 52b. When the forwardmost end parts of the cassettes 11 reach the inclined surfaces 53a and 53b, the cassettes 11 are held between the inclined surfaces 53a and 53b and the recess portions 52a and 52b in a clamped state, thereby preventing the cassettes from unpleasantly rattling in the casing member 3.

If the user erroneously tries to insert the raised portions 12 of the cassettes 11 into the pocket portion 4 at positions offset from the recess portions 51a and 51b, i.e., at positions each having a height h, the cassettes cannot be inserted in such a manner at all because the thickness of each cassette 11 between the opposite raised portions 12 is larger than the height h.

Left-hand projection-shaped guide portions 14a and 14b of each cassette 11 are received in groove portions 21a and 21b formed on the inner surface of the rear side wall of the cover member 2.

Also with the cassette storage case 1 constructed according to the third embodiment of the present invention, the overall structure of the cassette storage case 1 can be designed with smaller dimensions without the possibility that the cassettes 11 will unpleasantly rattle in the casing member 3, or that the opposite raised portions 12 of the cassettes 11 are erroneously inserted into the pocket portion 4 of the cover member 2.

Next, a magnetic tape cassette storage case constructed according to a fourth embodiment of the present invention will be described below with reference to FIG. 6.

A characterizing feature of the cassette storage case 1 according to the fourth embodiment of the present invention resides in the fact that the cassette storage case 1 can be designed with smaller dimensions in the same manner as in each of the aforementioned embodiments, and moreover a single cassette 11 can be inserted into a pocket portion 4 in two different directions.

Figure 6:
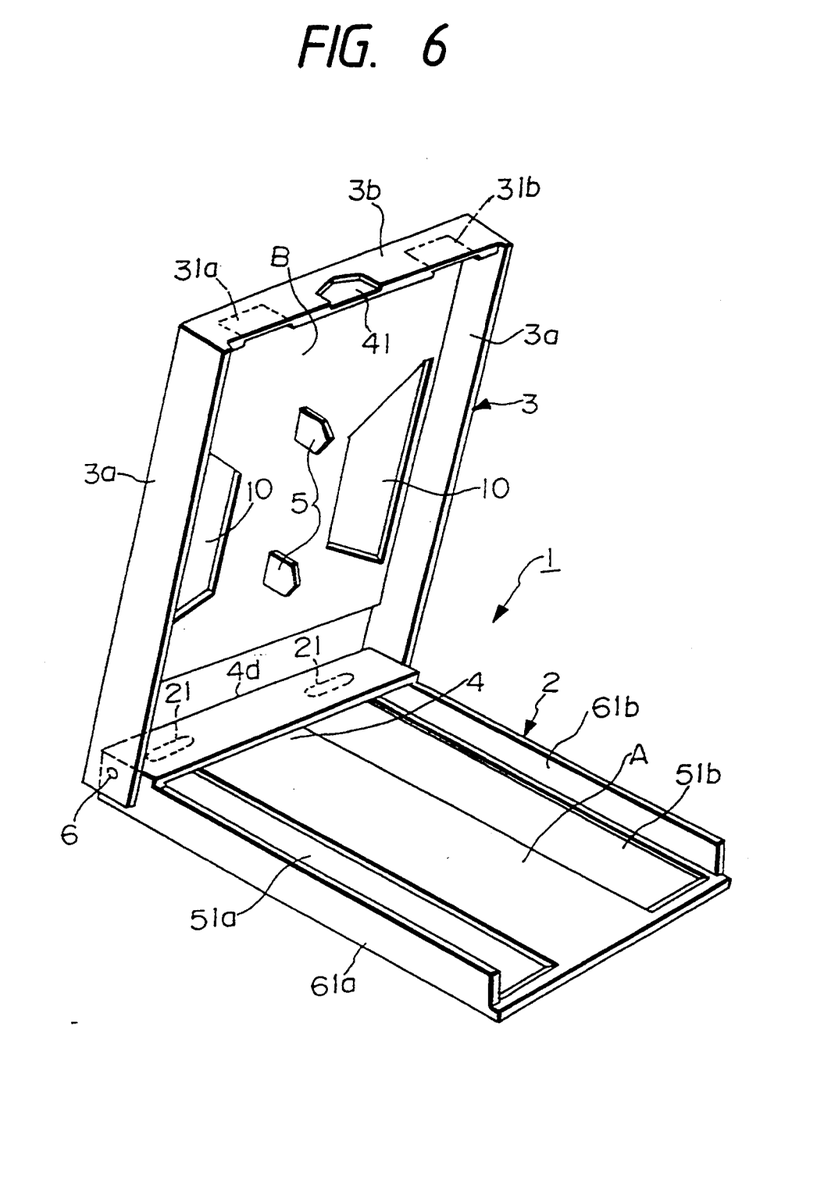
FIG. 6 is a perspective view of a magnetic tape cassette storage case constructed according to a fourth embodiment of the present invention.

FIG. 6 is a perspective view of the cassette storage case 1 constructed according to the fourth embodiment of the present invention. A pair of longitudinally extending recess portions 51a and 51b are formed on a planar portion A extending parallel to the opposite side walls 61a and 61b of a cover member 2, and the opposite side walls 61a and 61b extend upright from the flat plate portion A while extending across the full length of the cassette storage case 1. The interior width between the two side walls 61a and 61b is dimensioned such that two cassettes 11 can be inserted into a pocket portion 4 in the longitudinal direction.

Two groove portions 21 are formed on a rear side wall 4d of the pocket portion 4 of the cover member 2.

On the other hand, two recess portions 10 are formed on a planar portion B of a casing member 3 at positions which positionally coincide with the recesses 51a and 51b when the casing member 3 is rotatably closed with the cover member 2, and moreover two recess portions 31a and 31b are formed on the inner wall surface of a front side wall 3b of the casing member 3.

With the cassette storage case 1 constructed according to the fourth embodiment of the present invention, the opposite raised portions 12 of the two cassettes 11 can be received in one of the longitudinally extending recess portions 51a and 51b. In other words, the two cassettes 11 can be inserted in the cassette storage case 1 in two directions, resulting in the ease of use of the cassette storage case 1 being substantially improved.

When the cassettes 11 are received in the cassette storage case 1, the projection-shaped guide portions 14a and 14b can be fitted into the groove portions 21 and the recess potions 31 regardless of the direction of insertion of the cassettes 11. Thus, with the cassette storage case 1 of this embodiment, it is possible to design the cassette storage case 1 with smaller dimensions by virtue of the functional effects attributable to the formation of the recess portions 51a and 51b, the recess portions 10, the groove portions 21 and the recess portions 31a and 31b.

In this embodiment, a pair of rotation preventing projections 5 are formed with a small thickness at positions where they can be inserted into shaft insertion holes 13 of the cassettes 11 to be engaged with the tape hubs, regardless of the direction of inserting the cassettes 11 into the cassette storage case 1. The formation of the rotation preventing projections 5 with a small thickness is achieved due to the fact that the shaft insertion holes 13 of each cassette 11 are formed at positions offset from the center line of each cassette 11.

The rotation preventing projections 5 may be formed using an elastic material different from that of the main body of the cassette storage case 1 by adhering them to to a planar portion B of the case member 3 using an adhesive. Otherwise, they may be integrally molded with the casing member 3 by employing a two-color molding process. Especially in the case where the rotation preventing projections 5 are molded of an elastic material, a problem of loosening of the magnetic tape T can be prevented merely by bringing the rotation preventing projections 5 into engagement with the tape hubs. For this reason, a process of molding the rotation preventing projections 5 of an elastic synthetic resin is preferably employed for the cassette storage case 1 constructed according to the fourth embodiment of the present invention.

While the fourth embodiment of the present invention has been described above, it should be noted that the present invention should not be limited to the cassette storage case 1 of a type where each cassette 11 is inserted into the pocket portion 4 in the longitudinal direction. In practice, most cassettes 11 commercially available at present are inserted into the cassette storage case 1 in a transverse attitude. The cassette storage case 1 constructed according to the fourth embodiment of the present invention can preferably be applied to such a case.

Figure 7:
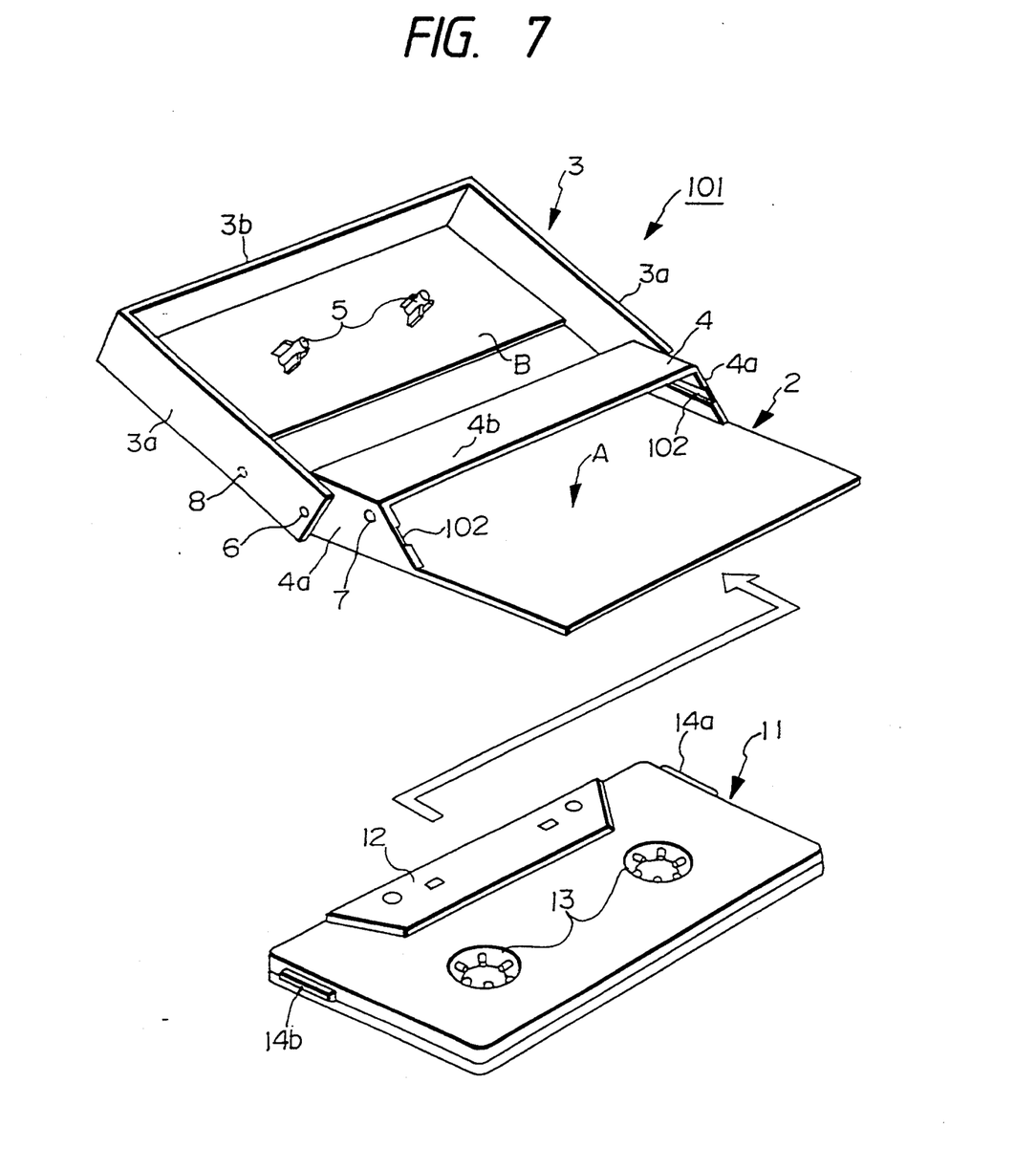
FIG. 7 is a perspective view of a magnetic tape cassette storage case constructed according to a fifth embodiment of the present invention, particularly showing a case member in an open state before a magnetic tape cassette is received in the cassette storage case.
Figure 8:
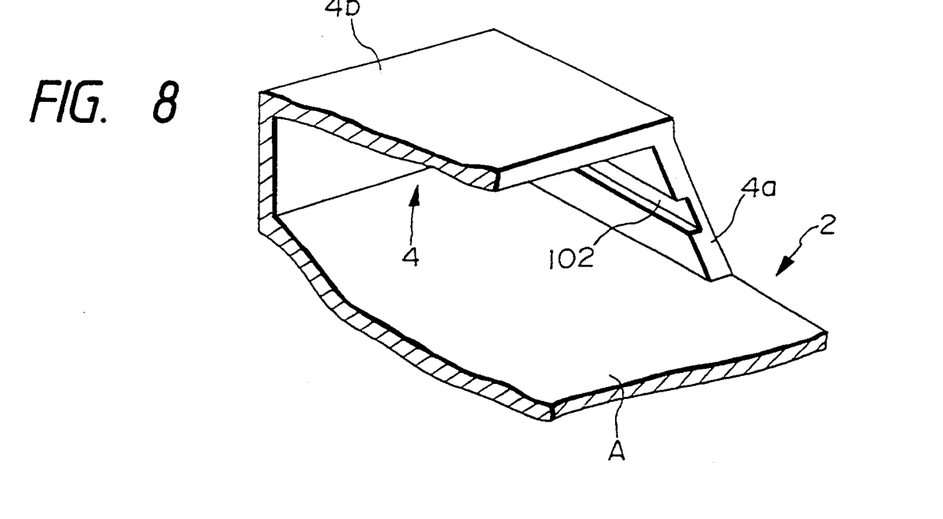
FIG. 8 is a fragmentary enlarged perspective view of the cassette storage case shown in FIG. 7, particularly showing a part of a pocket portion in an exploded state.
Figure 9:
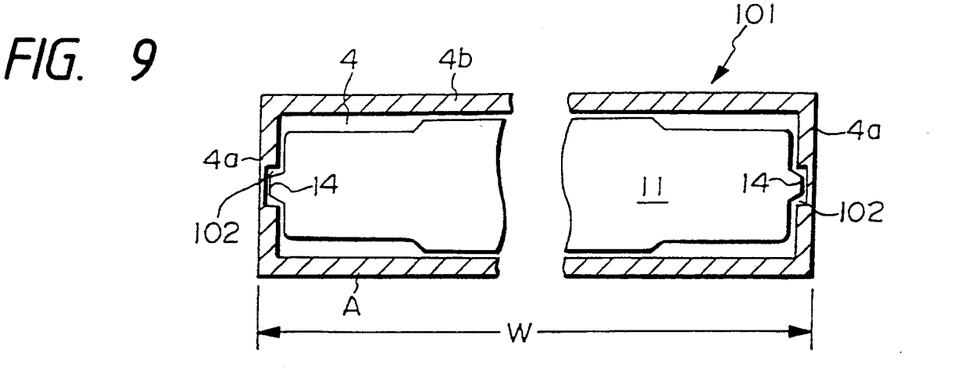
FIG. 9 is an enlarged sectional view of the cassette case storage case shown in FIG. 7, particularly showing groove portions formed on the opposite side walls of the pocket portion and recess portions formed on the lower surface of an upper plate of the pocket portion and a planar portion of a cover member.

Next, a magnetic tape cassette storage case constructed according to a fifth embodiment of the present invention will be described below with reference to FIG. 7 to FIG. 9. FIG. 7 is a perspective view showing the magnetic tape cassette storage case and a magnetic tape cassette to be received in the latter in a disassembled state, FIG. 8 is a fragmentary enlarged perspective view of the cassette storage case, and FIG. 9 is an enlarged sectional view of the cassette storage case.

The cassette storage case 101 is composed of a cover member 2 including a pocket portion 4 and a casing member 3 having a pair of rotation preventing projections 5 formed thereon. A pair of support shafts 6 project inside the opposite side walls 3a and 3b of the casing member 3 so that the casing member 3 is rotatably closed with the cover member 2 in a door-like manner by fitting the support shafts 6 into fitting holes (not shown) formed through the opposite side walls 4a of the pocket portion 4.

The pocket portion 4 serves to receive the opposite raised portion 12 of a cassette 11 therein, and is designed in a boxshaped configuration in which one end is exposed to the outside, while including a planar portion A extending from the cover member 2, opposite side walls 4a and 4b and an upper plate 4b. A pair of rotation preventing projections 5 are integrally formed on a planar portion B of the casing member 3 so that they can be inserted into shaft insert portions 13 of the cassette 11 to be engaged with hubs in order to prevent a magnetic tape T from being loosened when the casing member 3 is rotatably closed with the cover member 2.

Projections 7 are formed on the opposite side walls 4a of the pocket portion 4 while projecting outside therefrom, while engagement recesses 8 are formed on the opposite side wall 3a of the case member 3 at positions which positionally coincide with the projections 7 when the casing member 3 is rotatably closed with the cover member 2. With this construction, when the casing member 3 is rotatably closed with the cover member 2, the projections 7 are fitted into the engagement recesses 8, whereby the casing member 3 is held closed with the cover member 2.

A characterizing feature of the cassette storage case 101 constructed in the above-described manner resides in the fact that groove portions 102 are formed on the inner side wall surfaces of the pocket portion 4, i.e., the inner wall surfaces of the opposite side walls 4a face each other.

Specifically, the groove portions 102 serve to receive guide portions 14 of the cassette 11 therein when the opposite raised portions 12 of the cassette 11 are inserted into the pocket portion 4. As shown in FIG. 9 on an enlarged scale, the height of each of the guide portions 14a and 14b is such that each of the guide portions 14a and 14b is received within the thickness of each of side walls 4a and 4b when the cassette 11 is inserted into the pocket portion 4 of the cover member 2. Thus, the width W of the cassette storage case 1 can be reduced by an amount corresponding to twice the height of each guide portion, i.e., the height of two guide portions.

While the guide portions 14a and 14b unchangeably assume the dimensions as specified in conformity with the relevant rules, the width W of the cassette storage case 1 can be reduced by an amount substantially corresponding to the sum of the height of the guide portion 14a and the height of the guide portion 14b, resulting in the cassette storage case 101 being designed with smaller dimensions.

In addition, since the guide portions 14a and 14b are received in the groove portions 102 when the cassette 1 is inserted into the pocket portion 4, the cassette 11 is prevented from rattling in the cassette storage case 101.

Next, a magnetic tape cassette storage case constructed according to a sixth embodiment of the present invention will be described below with reference to FIGS. 10 and 11. FIG. 11 is a perspective view which shows the cassette storage case 101 and a cassette 11 to be received in the latter in disassembled state, and FIG. 11 is an enlarged sectional view of the cassette storage case 101. A characterizing feature of the cassette storage case 101 constructed according to the sixth embodiment of the present invention resides in the fact that recess portions 103a and 103b are formed on a planar portion A of a cover member 2 and an upper plate 4b of a pocket portion 4 so as to receive the opposite raised portion 12 of the cassette 11 therein. Similar structural components as those in the fifth embodiment of the present invention are represented by the same reference numerals. Thus, a further detailed description of these components will be omitted.

Specifically, the recess portion 103a is formed on the planar portion A of the cover member 2 so as to receive therein a lower raised portion 12 of the cassette 11 (not shown in FIG. 10 because it is formed on the lower surface side of the cassette 11), while the recess portion 103b is formed on the lower wall surface of the upper plate 4b of the pocket portion 4 so as to receive an upper raised portion 12 of the cassette 11 therein.

With this construction, as shown in FIG. 11, when the cassette 11 is received in the cassette storage case 10, the opposite raised portions 12 of the cassette 11 are received in the recess portions 103a and 103b, while the opposite guide portions 14a and 14b of the same are received in groove portions 102 of the pocket portion 4. Thus, with the cassette storage case 101 of this embodiment, not only can the width W of the cassette storage case 101 be reduced, but also the height H of the same can be reduced, resulting in the overall structure of the cassette storage case 101 being designed with smaller dimensions.

Figure 10:
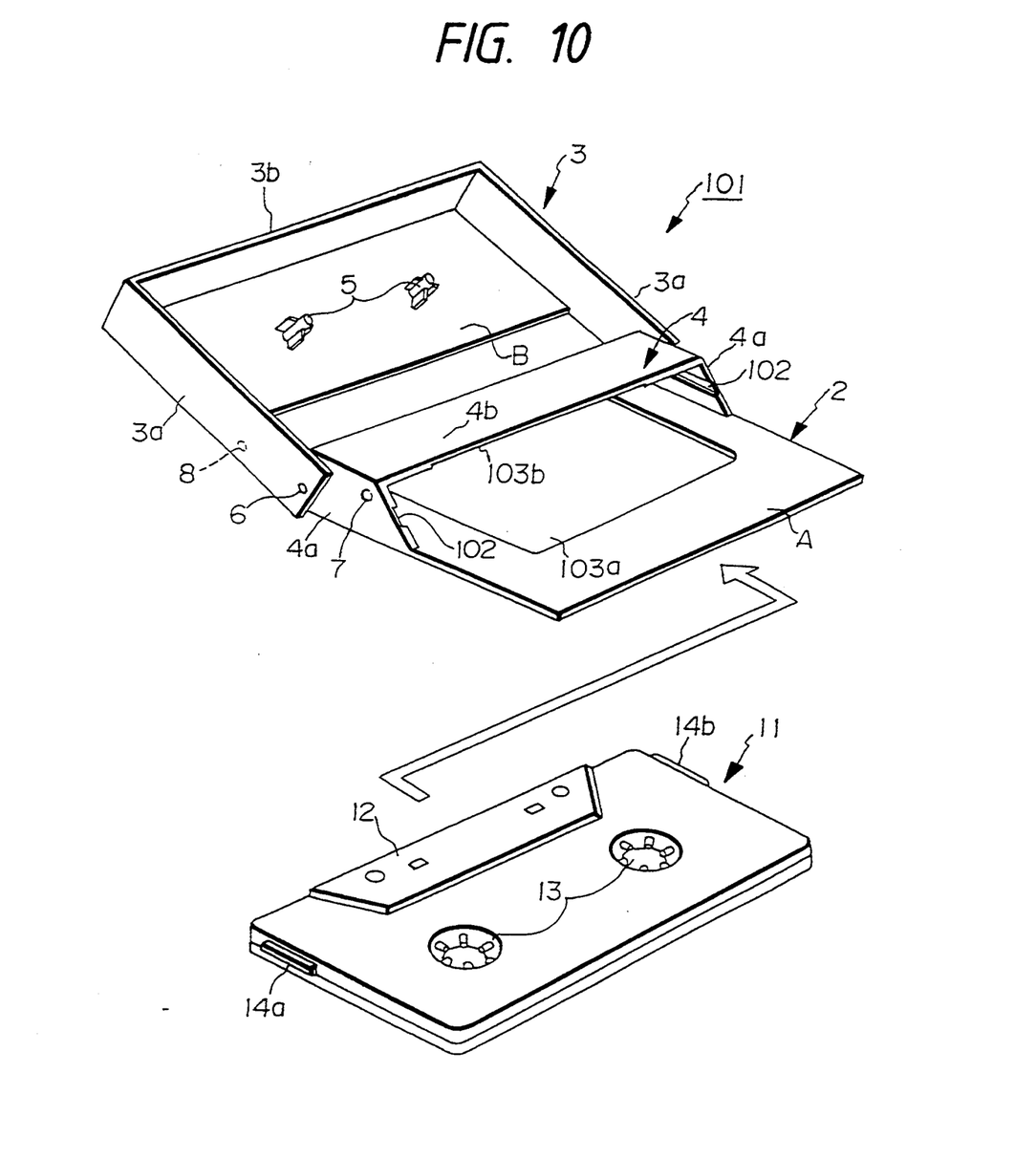
FIG. 10 is a perspective view of a magnetic tape cassette storage case constructed according to a sixth embodiment of the present invention, particularly showing a case member in an open state before a magnetic tape cassette is received in the cassette receiving portion.
Figure 11:
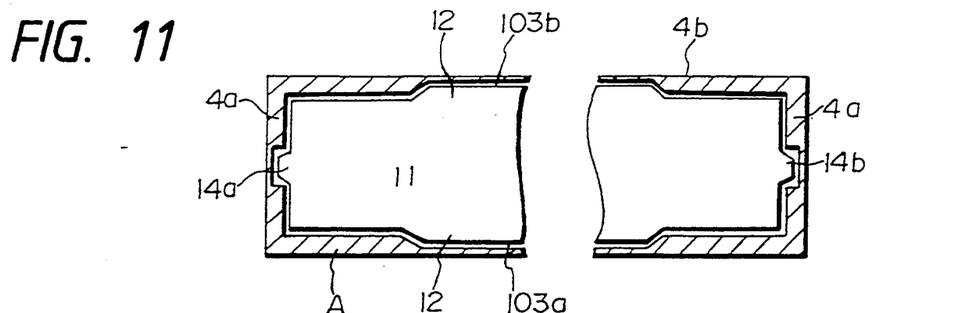
FIG. 11 is an enlarged sectional view of the cassette storage case shown in FIG. 10, particularly showing groove portions formed on the opposite side walls of a pocket portion and recess portions formed on the lower surface of an upper plate of a pocket portion and a planar portion of a cover member.

As shown in FIG. 10, a recess portion 103a is formed on the planar portion A with a large area so as to enable the cassette 11 to be smoothly inserted into the pocket portion 4. Provided that the recess portion 103a is formed only in the region located below the upper plate 4b, when the cassette 11 is received in the cassette storage case 101, there arises a problem that the upper raised portion 14 of the cassette 11 collides against the front edge of the upper plate 4b before the lower raised portion 12 of the same is received in the recess portion 103a, causing the cassette inserting operation to be achieved with some difficulty.

In practice, however, since the recess portion 103a is formed as shown in the drawings, the whole cassette 11 is inserted into the cassette storage case 101 as a part of the cassette 11 is received in the recess portions 103a and 103b, whereby the cassette insertion operation can smoothly be performed.

Figure 12:
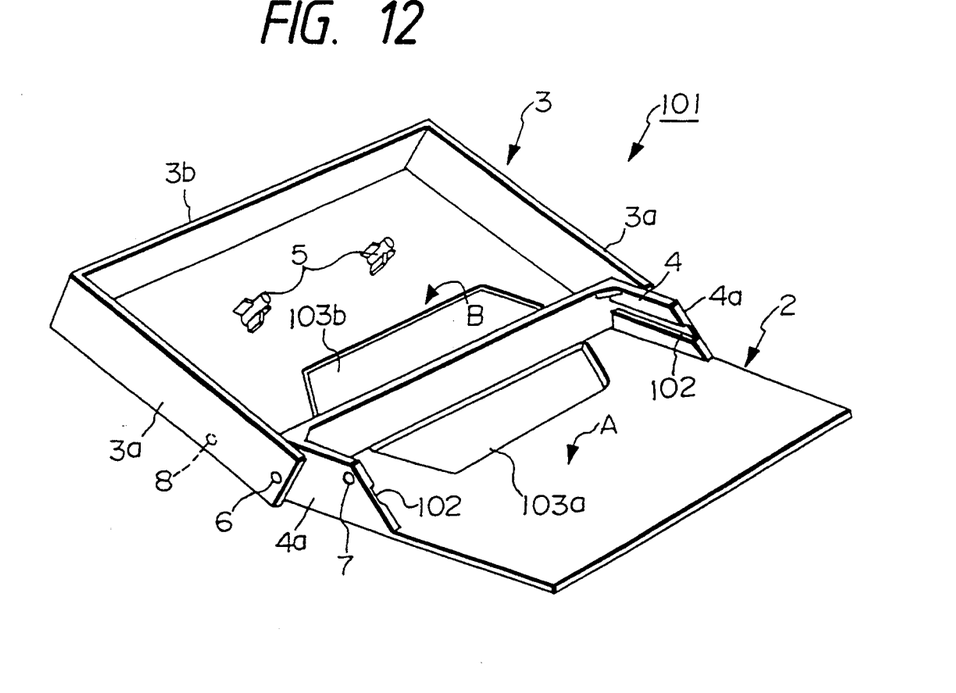
FIG. 12 is a perspective view of a magnetic tape cassette storage case constructed according to a seventh embodiment of the present invention.

Next, a magnetic tape cassette storage case constructed according to a seventh embodiment of the present invention will be described below with reference to FIG. 12. FIG. 12 is a perspective view of the cassette storage case 101. A characterizing feature of the cassette storage case 101 constructed according to the seventh embodiment of the present invention resides in the fact that the pocket portion 4 does not include an upper plate simlar to the upper plate 4b in the preceding embodiment, and moreover a recess portion 103b is formed on a planar portion B of a casing member 3.

Specifically, the pocket portion 4 does not include any upper plate, but since the recess portion 103b is formed on a planar portion B of the casing member 3 in the region which positionally coincides with the upper plate 4b in the preceding embodiment when the casing member 3 is closed with a cover member 2, the cassette 11 can smoothly be inserted into the cassette storage case 101 while the opposite raised portions 12 of the cassette 11 are received in the recess portions 103a and 103b.

In the case that the pocket portion 4 includes an upper plate 4b as is the case of the preceding embodiment, a cutout portion is formed on the casing member 3 side in the region corresponding to the recess portion 103b in this embodiment. However, in this embodiment, the recess portion 103b is formed in the region extending from the planar portion B of the case member 3.

In this embodiment, since the pocket portion 4 does not include any upper plate, the distance of slidable movement of the cassette 11 along a planar portion A of the cover member 2 can be shortened. With this construction, it suffices that the recess portion 103b formed on the planar portion B of the casing member 3 have the substantially same contour as that of each raised portion of the cassette 11 with substantially same dimensions as those of the same.

When the cassette 11 is inserted into a cassette storage case 101, the casing member 3 is first held in the open state as shown in FIG. 12, guide porions 14a and 14b of the cassette 11 are then inserted into groove portions 102 by thrusting the cassette 11 in the forward direction, and thereafter an upper raised portions 14 of the cassette 11 is received in the recess portion 103b by rotatably closing the casing member 3 with the cover member 2. Thus, once the cassette 11 is received in the cassette storage case 101, the opposite raised portions 12 of the cassette 11 are properly received in the recess portions 103a and 103b, while guide portions 14a and 14b are properly received in the groove portions 102.

Also in this embodiment, since the opposite raised portions 12 of the cassette 11 are received in the recess portions 103a and 103b, and the guide portions 14a and 14b of the same are received in the groove portions 102, the overall structure of the cassette storage case 101 can be designed with smaller dimensions.

As is apparent from the above description, according to the present invention, a characterizing feature of the cassette storage case constructed in the above-described manner resides in the fact that a groove portion is formed on the inner side wall surface of a pocket portion so as to allow at least one of projection-shaped guide portion of a cassette on the opposite sides of the latter to be received in the groove portion.

Thus, the width of the cassette storage case can be reduced by an amount corresponding to at least the height of one of the guide portions of the cassette, while one or both the opposite raised portions of the cassette is received in a recess portion formed in the planar portion A of the cover member. Thus, the cassette storage case can be designed with smaller dimensions. In addition, since the guide portions of the cassette are properly received in the groove portions, there does not arise a problem of the cassette unpleasantly rattling in the cassette storage case.

What is claimed is:

1. In a magnetic tape cassette storage case including a cover member having a pocket portion formed at one end part thereof to receive one end of opposite ends of a magnetic tape cassette and a casing member having rotation preventing projections formed thereon, said cover member being rotatably fitted to said casing member, wherein the improvement comprises: a groove portion, for receiving therein a projection-shaped guide portion on said one end of a said magnetic tape cassette when said one end of said magnetic tape cassette is received in said pocket portion of said cover member, the groove portion forming an indentation in a side wall constituting said pocket portion of said cover member, said side wall facing said projection-shaped guide portion after receipt of said magnetic tape cassette.

2. The magnetic tape cassette storage case of claim 1, wherein an opening portion is formed in a planar portion forming a main surface of at least one of said cover member and said casing member for receiving therein a thick portion of said magnetic tape cassette.

3. The magnetic tape cassette storage case of claim 2, wherein a recess portion is formed on an inner wall surface of a front side wall of said casing member for receiving a projection-shaped guide portion on the other end of said magnetic tape cassette when said magnetic tape cassette is received in said pocket portion and said storage case is in a closed arrangement.

4. The magnetic tape cassette storage case of claim 3, wherein said cover member and said casing member are dimensioned to receive two magnetic tape cassettes therein, and wherein two groove portions are formed in said side wall of said pocket portion and two recess portions are formed on said inner wall surface of said front side wall.

5. In a magnetic tape cassette storage case including a cover member having a pocket portion formed at one end part thereof to receive one end of the opposite ends of a magnetic tape cassette and a casing member having rotation preventing projections formed thereon, said cover member being rotatably fitted to said casing member, wherein the improvement comprises: a groove portion, for receiving therein a projection-shaped guide portion on said one end of a said magnetic tape cassette when said one end of said magnetic tape cassette is received in said pocket portion of said cover member, said groove portion forming an indentation in a side wall constituting said pocket portion of said cover member, said side wall facing said projection-shaped guide portion after receipt of said magnetic cassette tape, and a recess portion, for receiving therein a projection-shaped guide portion on the other end of said magnetic tape cassette therein when said one end of said magnetic tape cassette is received in said cover member of said magnetic tape cassette storage case, said recess portion being formed on an inner wall surface of a front side wall of said casing member corresponding with the other end of said magnetic tape cassette when said magnetic tape cassette is received in said pocket portion and said storage case is in a closed arrangement.

6. The magnetic tape cassette storage case of claim 5, wherein said cover member and said casing member are dimensioned to receive two magnetic tape cassettes therein, and wherein two groove portions are formed in said side wall and two recess portions are formed on said inner wall surface of said front side wall.

7. The magnetic tape cassette storage case of claim 6, wherein a pair of longitudinally extending recess portions each oriented toward said pocket portion are formed in a planar portion forming a main surface of said cover member, extending parallel with opposite sides of said case, for receiving thick portions of respective ones of said cassettes.

8. The magnetic tape cassette storage case of claim 7, wherein ends of said longitudinally extending recess portions for receiving said thick portions adjacent said pocket portion are slanted in the form of inclined surfaces.

9. The magnetic tape cassette storage case of claim 8, wherein a height of said pocket portion in an area between said longitudinally extending recess portions is sufficiently great to allow a planar main surface portion of each of said cassettes to pass but sufficiently small to prevent a thick portion of each of said cassettes to pass.

10. In a magnetic tape cassette storage case including a cover member having a pocket portion formed at one end part thereof to receive opposite raised portions of a magnetic tape cassette therein and a casing member having rotation preventing portions formed thereon, wherein the improvement comprises: a groove portion, for receiving therein a projection-shaped guide portion on one of opposite ends of a said magnetic tape cassette, the groove portion forming an indentation in the inner wall surface of at least one of opposite side walls constituting said pocket portion of said cover member.

11. The magnetic tape cassette storage case of claim 10, wherein a said groove portion is formed in the inner wall surface of each of said opposite side walls of said pocket portion which inner wall surfaces face one another.

12. The magnetic tape cassette storage case of claim 11, wherein recess portions for receiving a thick portion of said cassette are formed in a planar portion of a main surface of said casing member and in an upper plate of said pocket portion.

13. The magnetic tape cassette storage case of claim 11, wherein said pocket portion has no upper plate, and wherein recess portions for receiving a thick portion of said cassette are formed in a planar portion of a main surface of said casing member and in said cover member.

* * * * *